Nov. 15, 1955 A. J. KLAPPERICH 2,724,091

CONTROLLING THE Q VALUES OF COILS

Filed May 13, 1950

CONVENTIONAL CKTS. USING INDUCTANCE MEMBERS

INVENTOR.
Alfred J. Klapperich

BY Brown, Jackson, Boettcher & Dienner

ATTORNEYS

United States Patent Office 2,724,091

Patented Nov. 15, 1955

2,724,091

CONTROLLING THE Q VALUES OF COILS

Alfred J. Klapperich, Chicago, Ill.

Application May 13, 1950, Serial No. 161,890

13 Claims. (Cl. 333—99)

The present invention relates, in general, to an improved electrical circuit element of the reactive type and, more particularly, to an improved inductive reactive coil element and the novel method of providing same.

In the somewhat rapid development of the electrical and electronic fields, and particularly with the expansion of the radio and television branches of these fields into the higher frequency spectrums, the various types of circuit elements which were originally used for effecting the desired circuit constants, as for example, inductance, capacitance and resistance, proved to be somewhat inadequate and unsatisfactory, and accordingly extensive improvement and modifications of these elements became necessary.

However, the development of certain of these circuit constant determining elements, for example, the inductive reactance type coil elements, has been somewhat retarded by reason of the extremely technical nature of this subject matter, and, as a consequence, the provision of radio and television circuits having the proper quality factors or merit factors concomitant with other circuit parameters has proven somewhat difficult.

It is well known, for instance, that in the design of a circuit which is adapted for coupling purposes of radio frequency values, the practice has heretofore been to first select the coefficient of coupling required to give the desired band width and to subsequently adjust the circuit merit factor or Q to the desired value by resistance loading of the circuit. Specifically, in designing and constructing band-pass circuits, it is customary to select a resonant circuit having a higher Q value than the value required to obtain a proper band-pass action for the band width desired, and to subsequently connect resistance of predetermined values in shunt of the tuned circuit to obtain a good band-pass characteristic. See Terman's Radio Engineering Handbook, McGraw Hill 1947 edition, pages 69, 71 and 356, which teaches such method in the provision of single, double and multiple tuned resonant circuits.

The result of resistance loading of resonant circuits in this manner is to effect a compromise Q value which at one point in the band may approach the desired value, but which at other points in the desired band width is at a considerable variation from the chosen value, whereby the phase and time delay distortion of the circuit are accordingly undesirably magnified.

There is a definite need in the radio and television arts, therefore, for an improved and novel type coil element which is adapted for use in wideband response resonant circuits, and it is to the provision of such type coil and the method of providing same that this invention is directed. It is a further object of the invention to provide a coil element which, in circuit use, provides a correct merit factor and a flat response curve for the chosen band width of the resonant circuit.

With reference to the drawings, for more detailed consideration of the invention:

Figure 1:
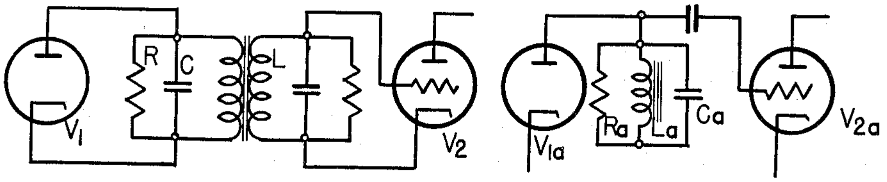
Figure 1 is a circuit diagram of the conventional type band-pass resonant circuit which includes a reactance member of the type with which the invention is concerned.

The Q or merit factor of a coil, by definition, is determined by the ratio of $$\frac{X_L}{R_S}$$

wherein $X_L$ is the reactance of the coil and $R_S$ is the series resistance or summation of the various losses inherent in that coil. The resistance $R_S$ may be considered as comprising the summation of the coil direct current resistance, which is to be hereinafter termed $R_{DC}$, and the coil high frequency losses, hereinafter termed $R_{HF}$, which are determined by the high frequency resistance of the coil opposing the flow of current down a given section of wire (skin effect); a separate eddy current loss due to the field produced by energization current for the same section of wire (proximity effect); and a dielectric loss resulting from the dielectric in the electrostatic field of the coil. Of these various losses, the $R_{DC}$ component, and the high frequency loss resulting from skin effect, normally constitute the major portions of the total loss, and, accordingly, these losses will, for practical purposes, determine the characteristics of the coil and interconnected circuit.

In further keeping with this relative relation of coil losses, the merit factor of a coil appears to be of maximum value when in the coil direct current losses $R_{DC}$ are equal to the high frequency losses $R_{HF}$.

Therefore, in selecting a circuit having a Q value which is higher than the value required to obtain proper band-pass action for the desired band width, as heretofore taught by the art, the subsequent lowering of the circuit Q by shunt resistance loading results in a considerable variation of the relative values of the direct current resistance loss $R_{DC}$ of the coil and the high frequency loss $R_{HF}$ of the coil. Conventional coil elements, as a result, frequently have $R_{DC}$ losses which are 15 or 20 times as large as the $R_{HF}$ losses and the coils are therefore extremely unsatisfactory for use with wide band responsive circuits.

It is known that the addition of iron powder as a magnetic element in the circuit introduces new losses, in addition to those heretofore described, which are a function of the frequency squared, and according to the present invention, the desired flattened type responsive curve for a desired band width is accomplished through the provision of a coil having controlled and proportioned high frequency and direct current losses. Specifically, a coil in which the value of Q is maximum at the middle frequency of the band width is effected by proportioning the high frequency inductive losses $R_{HF}$ and the direct current resistance losses $R_{DC}$ in a novel manner, so that they are equal at the middle frequency of the band width at which the coil is designed to operate. Such proportion of inductive and resistance losses is expressed by the equation:

$$\frac{R_{DC}}{2\pi fL}=\frac{R_{HF}}{2\pi L}$$

in which $R_{DC}$ is the above defined direct current loss in the coil, $R_{HF}$ is the above defined high frequency losses therein, and $f$ is the frequency.

Coils formed with these characteristics are operative at the point of maximum coil merit and at a point on the response curve where the frequency variation will have little effect on the coil merit factor.

According to one embodiment of the invention, proportioning of the coil resistance and inductive losses is accomplished by coating the coil or winding with a very "poor" high frequency iron powder; that is, an iron powder which has a very large frequency loss in the frequency spectrum for which the coil is adapted to operate. Inasmuch as the high frequency loss of an iron powder is different at various frequencies and such losses are different in value for each of the various types of irons, the effective iron powder will necessarily be one which has its maximum loss at the operating frequency for which the coil is adapted.

In a coil adapted to operate within the band width of 20 to 26 megacycles; for instance, preferred iron powders for use in the coating of the coil to increase the above defined high frequency loss $R_{HF}$ to the above defined direct current losses $R_{DC}$, might comprise carbonyl iron powders (particularly for use in the 20–30 mc. frequency range). These pure iron carbonyl powders comprise the large size type "L" or "C" (20–60 micron size) which have a very high loss and are preferred where a high loss is desired; and also comprise a small size type "TH" or "SF" (2 to 10 micron size) which have a low loss at high frequencies; and still further these carbonyl powders comprise a large particle type "H. P." which I can frequently use to advantage. I may also use powders from the "IRN" series, in which "IRN–17" containing alloying elements to increase the specific resistance have low loss at high frequencies, but in which series the "IRN–31" or the "IRN–3" powders, lacking these alloying elements, have a high loss, making them more often desirable in the present situation.

The above mentioned powders identified as carbonyl L, carbonyl H. P., and IRN–31 and IRN–3, are powders which are characterized by their large particle size and inherent hysteresis loss, the large particle size giving rise to large eddy current loss at high frequencies. The hysteresis loss, a function of alloying elements of the iron powder, also increases the loss at high frequencies and the resultant large losses at high frequencies make these types of powders undesirable for use with permeability tuned circuit elements at high frequencies. Powders having a large loss are conventionally known in the art as "poor" powders, and the invention is directed to the use of powders of this class in coil members. Specifically, I claim the application of a "poor" powder to, or in conjunction with, an inductive element of the circuit to supply to such inductive element a large high frequency loss sufficient to effect proportioning of the resistive loss to the high frequency loss, according to the formula:

$$\frac{R_{DC}}{2\pi fL}=\frac{R_{HF}}{2\pi L}$$

After selection of the proper "poor" iron powder, in accordance with the above teaching, a binder of polystyrene, methylmethacrylate, or other similar type binder cement, is desirably added thereto to facilitate application of the "poor" iron to the outer surfaces of the coil and to effect control of the proportions of iron powder applied.

The thickness of the iron powder mixture to be applied is again determined by the frequency range in which the coil is to operate, the Q values desired, and the characteristics of the powder employed. In arriving at the thickness of coating required, the desired Q value for the circuit is established and the allowable losses are computed. The iron powder is then applied in a thickness sufficient to effect an $R_{HF}$ loss which is one-half of the desired loss value. The remaining loss is, of course, the $R_{DC}$ component and is adjusted through resistance loading to effect an $R_{DC}$ loss, which is equal to the $R_{HF}$ loss.

Figure 2:
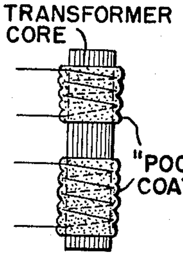
Figure 2 illustrates a transformer winding coated in accordance with the invention.

In a specific embodiment which is adapted for coating a winding for a .17 megacycle transformer of the type shown in Figure 1, having a band width of 6 megacycles in which a Q of 5 was necessary, and in which the slugged coil had an inductance of $5\times10^{-6}$, a mixture of H. P. powder (a poor iron) in the amount of 2% by weight of the total weight of good iron in the slug was mixed with a polystyrene binder in an approximate proportion of 80% Fe and 20% binder, and the mixture was applied to the transformer winding in a thickness of approximately .001 inches to achieve the desired $R_{DC}$ and $R_{HF}$ value such as I have schematically illustrated in the diagrammatic view of Figure 2.

The results achieved by coating to effect this loss ratio are particularly evident when compared with the operating characteristics of a conventional type transformer winding designed for use in a similar circuit arrangement; that is, at a band width of 6 MC and a center band frequency of 17 MC. Such a structure, in accordance with known design, might comprise a unit having the following characteristics:

$$L=5\times10^{-6}\text{ henries}$$

Distributed capacity=25$\mu\mu$fd. D. C. coil loss=6 ohms, high frequency loss $R_{HF}=8\times10^{-8}f$. These two losses give an unloaded Q of 84. Based on the formula:

$$\frac{1}{Q}=\frac{R_{DC}}{2\pi fL}+\frac{R_{HFf}}{2\pi L}$$

$$\frac{1}{Q}=\frac{6}{505}+\frac{(8\times10^{-8})(17\times10^{6})}{(31.4)(10^{-6})}$$

$$Q=84.2+.0024$$

For the purpose of gaining the desired band width, the coil, in accordance with conventional practice, is now loaded down with 3900 ohms in a parallel relationship with the tuned circuit, which is the equivalent of 100 ohms in series. Thus, the D. C. loss $R_{DC}$ now is 106. And the Q at 17 mc. is $$\frac{1}{Q}=\frac{106}{505}+\frac{(8\times10^{-8})(17\times10^{6})}{(31.4)(10^{-6})}$$

whereby $Q=4.86+.0024=4.86$ the desired Q.

It is particularly interesting to note the small high frequency loss (.0024) in the conventional arrangement, the ill effects thereof becoming apparent with reference to the Q value which is achieved at the several points of the band width. For example, at one edge of the band (14 mc.) the Q is equal to $$Q=3.95+\text{negligible (approximately .0024)}=3.95$$

At the other end of the band (20 mc.)

$$Q=6.57+\text{negligible (approximately .0024)}=6.57$$

It is obvious therefrom that the Q factor will vary from 3.95 to 6.57 in a coil which is made in accordance with conventional practice.

Figure 3:
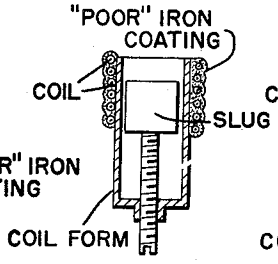
Figure 3 is a cross section of the wire of a coil member, as coated in accordance with a further embodiment of the invention.
Figure 4:
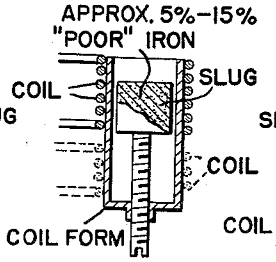
Figures 4 and 5 show, respectively, the use of a coil member having a slug and shield arrangement having improved characteristics in accordance with one embodiment of the invention.
Figure 5:
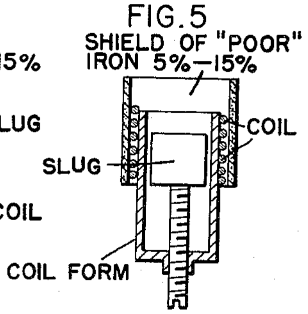

Consider now the provision of a coil member in accordance with the teachings of the invention, particularly as illustrated in Figures 3, 4 and 5. Referring first to Figure 3, this embodiment shows a coating of a poor iron and a cement applied directly over the coil. From the above computations, it is seen that to provide a coil having a merit factor of 5, the total coil losses must be approximately 106 ohms and, since the losses are to be equally divided between a high frequency iron loss $R_{HF}$ and a direct current loss $R_{DC}$, each must be equal to one-half of 106 ohms, or approximately 53 ohms. A series resistance of 53 ohms, or its shunt equivalent of 5000 ohms, is therefore used with the coil.

Similarly, the high frequency loss must also equal 53 ohms, and accordingly a mixture of poor iron and cement is painted on the coil in the manner heretofore described to raise the high frequency loss of the coil to this predetermined value.

In a particular example, the use of an iron having a loss characteristic expressed by $$\frac{ef}{2\pi L}$$

where $e$ for the poor iron is equal to $.19\times10^{-6}$, ohm mc., provided a coil having a Q as follows:

$$\frac{1}{Q}=\frac{R_{DC}}{2\pi fL}+\frac{ef}{2\pi L}=\frac{1}{9.5}+\frac{1}{9.7}=4.79$$

at 17 mc.

It is apparent that a coil Q value of approximately 5 has been effected. In addition, the high frequency and direct current losses are balanced and a constant characteristic for an extremely wide frequency band is effected, such achievement becoming apparent by reference to the Q values of the coil at each end of the selected band. Specifically by substitution in the above formula, at 14 mc., $Q=4.71$ and at 20 mc., $Q=4.73$.

Thus, flat response over a wide band width has been achieved.

Figure 6:
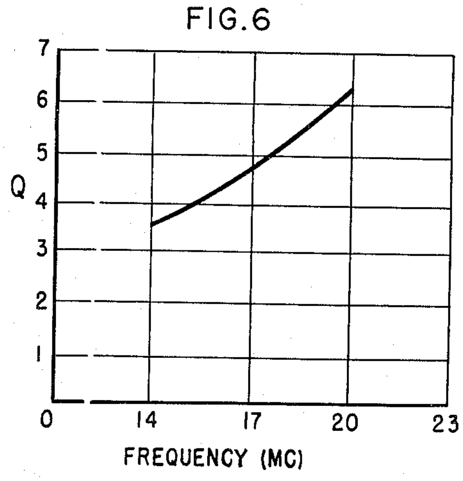
Figure 6 is a plotted curve showing the merit factor Q as plotted against frequency, and the manner in which a coil of the conventional type effects a wide Q variation.

With reference to Figure 6, it is seen that the Q vs. frequency curve of the coil which has been made in accordance with conventional practice is of an extremely non-symmetric nature, and, in fact, effects variations of approximately 40% over the desired band width.

Figure 7:
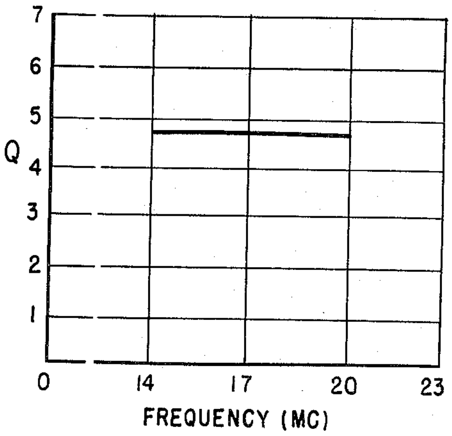
Figure 7 is a curve plot of the merit factor Q versus frequency, showing the manner in which the Q is maintained approximately constant over a given band width.

Referring to Figure 7, which is a plot of the characteristic of the coil made in accordance with the teachings of the invention, it is seen that the characteristic Q curve of the coil is substantially flat over the desired band width. Inasmuch as the gain and delay time distortion are functions of a variable Q value, the adverse effects which are present in the conventional type coil have been eliminated in the new type coil embodiment.

Referring now to Figure 4, according to a second modification of the invention shown therein, inductive loading may be likewise achieved in coils having tuning iron core slugs by incorporating a powder with the iron slug which has a high frequency loss at the particular frequency at which the coil is designed to operate. The inductive loss of the coil as a result of the high frequency losses of the iron powder incorporated in the slug may be proportioned to equal the direct current losses of the coil $R_{DC}$, as heretofore taught, whereby the same type flattened characteristic Q curve will be attained. In this construction, the poor iron powder being incorporated with the tuning slug, the amount of the high frequency loss introduced in the circuit varies directly as the inductance. The tuning slug may be comprised of a mixture of "good" and "poor" powders, the poor powders being in the nature of from 1%—15% of the total weight of the slug the maximum percentage (15%) will of course increase with the use of a frequency loss iron of less loss, the present percentages being applicable in the use of the aforementioned irons C, L, HP carbonyl irons, IRN31 etc. This same feature of an adjustable slug incorporating the aforementioned "poor" powder for obtaining an adjustable high frequency loss in a transformer structure can be obtained by placing another coil on the coil form in Figure 4, as indicated in dotted lines, the two coils thus forming primary and secondary windings of a transformer. Referring to Figure 5, the use of a sleeve of iron about the coil will, of course, effect similar results in varying the high frequency losses $R_{HF}$ of the coil. The sleeve should preferably comprise a mixture of a "poor" iron powder and good iron similar to that set forth above. Positioning of the sleeve will effect variations in the value of the high frequency resistance losses and simplicity of proportioning of the losses in relation to each other is readily effected.

The combination of several of these methods may prove desirable in various practical applications of the invention. For instance, it may be desirable to coat the coil to achieve the approximate high frequency $R_{HF}$ loss and to use a slug member of the described type to obtain the final selective adjustment of the inductance in the described manner. Similarly, the combinations of the shield and coating methods may prove desirable for given installations. Various other combinations of these disclosed methods for obtaining the proportioning of the inductive and resistance losses in the loading of a coil become immediately apparent and should be considered to be within the scope of the invention.

What is claimed is:

1. An electrical circuit inductive reactance member adapted for operation over a given band of at least several megacycles at a particular merit factor Q comprising; an inductive reactance element having a predetermined component current resistance loss, and control means comprising a large high-frequency loss material and a given amount of a low high-frequency loss material to provide with the high frequency losses of said reactance member and a total frequency loss at the mid-point frequency in said band which is of equal value to the value of said predetermined current resistance loss.

2. An electrical circuit inductive reactance member having a constant predetermined merit factor Q in its use over a band width of several megacycles comprising; a reactive coil element having a first fixed means for providing a predetermined value of current resistance loss at the mid-point of said band, and a second fixed means adjusted to provide a high frequency loss equal to said first predetermined loss comprising a coating on said coil element having a given thickness of high loss iron powder.

3. An electrical circuit inductive reactance member having a constant predetermined merit factor Q in its use over a band width of at least several megacycles comprising; a reactive coil element having a first fixed means for providing a predetermined resistance loss at a given frequency in said band width, and a second fixed means adjusted to provide a predetermined frequency loss which at said given frequency is equal to said resistance loss, said latter means comprising a predetermined thickness of high loss iron powder coated on said coil.

4. An electrical circuit inductive reactance member adapted to have a constant merit factor Q in use over a band of at least several megacycles in width, comprising; a coil member having a predetermined inductance and a coil loss of a value calculated to provide said desired Q value at one point in said band, resistance means adjusted to provide a loss equivalent to one-half of the coil losses for said given merit factor Q, and a shield comprising a mixture of iron having low frequency losses and an iron having high frequency losses at the predetermined operating frequency of the coil, said shield including fixed means adjusted prior to use to provide a frequency loss which is equal to said resistance loss at said predetermined operating frequency.

5. An electrical circuit inductive reactance member adapted to have a particular merit factor Q in a given band of operation being at least several megacycles in width which comprises; a coil having a predetermined inductance, means including the resistance of the coil operative to provide one-half of the resistance losses required to effect said given merit factor, a slug member comprising a mixture of an iron having low frequency losses and an iron having high frequency losses at a predetermined frequency, said slug comprising a proportion of high frequency loss iron which is in the amount of between 1% and 15% by total weight of said low frequency loss iron to provide with the inherent high-frequency losses of the coil a frequency loss which is equal to said current resistance losses at the mid-point frequency in its calculated operating band.

6. The method of constructing an inductive reactance member having a preselected constant merit factor Q over a band width of several megacycles, which comprises the steps of determining the total resistance losses in said member to provide said predetermined merit factor at a given frequency in said band, adjusting the current resistance of said reactance member to a value of one-half of the losses so determined, and coating said reactance member with a coating including a relatively poor iron powder having a substantial high frequency loss, and proportioning such coating of a thickness to provide a frequency loss which is equivalent in value to that of the coil current resistance losses at the desired frequency.

7. The method of constructing an inductive reactance coil member adapted for operation at a substantially constant preselected merit factor over a band width of several megacycles, which comprises the steps of determining the total resistance losses required in said coil to effect said predetermined merit factor, measuring the resistance loss of the coil as constructed, adjusting the current resistance of the coil to one-half of the determined losses, and coating said coil with a coating at least .001 inch thick comprising a mixture of an iron powder having a low frequency loss and an iron powder having a high frequency loss which is sufficient to provide a coil frequency loss equivalent to that of the coil current resistance losses.

8. The method of constructing a shielded coil inductive reactance member for use at a preselected merit factor and adapted for use in an electrical circuit at a given value of frequency, which comprises the steps of determining the total resistance losses required in said member to effect said predetermined merit factor, connecting resistance in circuit therewith to provide a total resistance loss which is equivalent to one-half of the determined losses, and adjusting the frequency loss of said coil by providing a shield comprising a mixture of iron having low frequency losses and an iron having high frequency losses at the predetermined operating frequency in an amount sufficient to increase said coil frequency losses to one-half of the total calculated coil losses.

9. The method of constructing an inductive reactance member of the slugged coil type having a constant preselected merit factor for a predetermined frequency band which comprises the steps of measuring the resistance loss of the member, adjusting the current resistance of the member to substantially one-half of the total losses of said member adapted to operate at said Q factor at the mid-point of said frequency band, and providing a slug for said coil which is made of an iron powder having a low frequency loss and an iron having a high frequency loss in sufficient proportion to establish a total frequency loss with the inherent high-frequency loss of the member at the mid-point of said frequency band which is equivalent to that of the coil current resistance losses.

10. An electrical reactance member adjusted for operation at a constant merit factor Q in a given frequency band of at least several megacycles comprised of a structure having a given current resistance loss, and frequency loss controlling means including a magnetic material of high loss characteristic and a magnetic material having a low high frequency loss characteristic additively combined with the inherent high frequency losses of the structure to provide a frequency loss for said reactance unit at the mid-point of said operating band which is equal to said current resistance loss.

11. An electrical reactance member adapted for use at a constant merit factor Q in a given band having a width of at least several megacycles including current resistance means of a given predetermined value, and frequency loss controlling means including a magnetic material of high loss low Q characteristic fixedly adjusted prior to use to provide a frequency loss with the inherent high frequency loss of the coil at the mid-point in said band which is equal to said current resistance loss.

12. An electrical reactance member having a given total loss $R_S$ of a predetermined value to provide a given merit factor Q in operation, including control means for maintaining the value of said desired Q constant when said member is used in a band width of at least several megacycles, said control means comprising current resistance loss means adjusted to provide a resistance loss $R_{DC}$ which when determined by the formula $$\frac{R_{DC}}{2\pi f 1}$$

is equal to one half of said total losses $R_S$ and a frequency loss control means including a quantity of poor iron fixedly adjusted to provide a high frequency loss additively combined with the high frequency losses of said reactance member to provide a high frequency loss $R_{HF}$, as computed by the formula $$\frac{R_{HF}}{2\pi L}$$

which is equal in value to said resistance loss at the mid-point frequency of said operating band.

13. A slugged coil electrical reactance member having a constant Q over a band width of at least several megacycles and having a given total loss at that Q factor operating value, a first means adjusted to provide a resistance loss of one-half said total loss, and a second means adjusted to provide a high frequency loss of one half said total loss comprising a mixture of a poor iron and good iron in the amount of 1–15% by weight of the total weight of good iron mixed with a polystyrene binder in an approximate proportion of 80% iron and 20% binder coated on said coil in a thickness of approximately .001 inch.

References Cited in the file of this patent

UNITED STATES PATENTS

| | | |
|---|---|---|
| 2,180,413 | Harvey | Nov. 21, 1939 |
| 2,439,277 | Walker | Apr. 6, 1948 |
| 2,450,192 | Freeman | Sept. 28, 1948 |
| 2,457,806 | Crippa | Jan. 4, 1949 |
| 2,521,536 | Reardon | Sept. 5, 1950 |

FOREIGN PATENTS

| | | |
|---|---|---|
| 115,025 | Australia | Jan. 31, 1940 |

OTHER REFERENCES

Printed Circuit Techniques, National Bureau of Standards Circular 468, page 18, issued November 15, 1947.